United States Patent
Bedford

(10) Patent No.: US 6,796,561 B2
(45) Date of Patent: Sep. 28, 2004

(54) GAME WITH COMMONLY MOVED ENEMY

(75) Inventor: Jonathan Bedford, Hawthorne, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/286,362

(22) Filed: Nov. 1, 2002

(65) Prior Publication Data

US 2003/0080506 A1 May 1, 2003

Related U.S. Application Data

(60) Provisional application No. 60/340,007, filed on Nov. 1, 2001.

(51) Int. Cl.[7] .................................................. A63F 3/00
(52) U.S. Cl. ........................ 273/243; 273/255; 273/262
(58) Field of Search ................................. 273/243, 255, 273/286, 262, 263, 287, 285

(56) References Cited

U.S. PATENT DOCUMENTS

| | | |
|---|---|---|
| 565,450 A | 8/1896 | Gibson |
| 990,918 A | 5/1911 | Stadler |
| 1,430,778 A | 10/1922 | Williams |
| 1,549,610 A | 8/1925 | Reisz |
| 1,819,932 A | 8/1931 | Walden |
| 1,870,395 A | 8/1932 | Zarin |
| 1,992,618 A | 5/1935 | Jeffreys |
| 3,767,201 A | 10/1973 | Harper et al. |
| 3,804,416 A | 4/1974 | Jones et al. |
| 4,046,381 A | 9/1977 | Comeaux |
| 4,090,717 A | 5/1978 | Rossetti |
| 4,130,284 A | 12/1978 | Fuks |
| 4,333,654 A | 6/1982 | Allain, deceased |
| 4,349,973 A | 9/1982 | Penick et al. |
| 4,534,565 A | 8/1985 | Hube |
| 4,585,233 A | 4/1986 | Wilson |
| 4,648,601 A | 3/1987 | Carmichael |
| 4,781,384 A | 11/1988 | Bois |
| 4,861,040 A | 8/1989 | Peterson |
| 5,022,681 A | 6/1991 | Penick |
| 5,049,078 A | 9/1991 | Thomsen |
| 5,096,204 A | 3/1992 | Lippman |
| 5,195,750 A | 3/1993 | Courialis |
| 5,213,507 A | 5/1993 | Ozrovitz |
| 5,228,698 A | 7/1993 | Dubarry, Jr. |
| 5,358,252 A | 10/1994 | McPhaul |
| 5,415,412 A | 5/1995 | McMahon |
| 5,443,268 A | 8/1995 | Mayfield et al. |
| 5,562,520 A | 10/1996 | Pridonoff et al. |
| 5,678,819 A | 10/1997 | Underwood |
| 5,681,199 A | 10/1997 | Morris |
| 5,682,999 A | 11/1997 | Larson |
| 5,704,611 A | 1/1998 | Pierce |
| 6,120,029 A | 9/2000 | Carmichael et al. |
| 6,170,825 B1 | 1/2001 | Pflum |
| 6,203,017 B1 | 3/2001 | Schultz |

*Primary Examiner*—Vishu Mendiratta
(74) *Attorney, Agent, or Firm*—Kolisch Hartwell, P.C.

(57) ABSTRACT

A game wherein players move their game pieces around a pathway collecting tokens from a plurality of stores while trying to avoid sharing a space with a commonly controlled chaser piece is described. Moreover, the game may be portable. In some cases, the game apparatus may be carried in a plastic case that resembles a hard-backed book. The game components may be based on an individual chapter from a published children's book or novel.

8 Claims, 1 Drawing Sheet

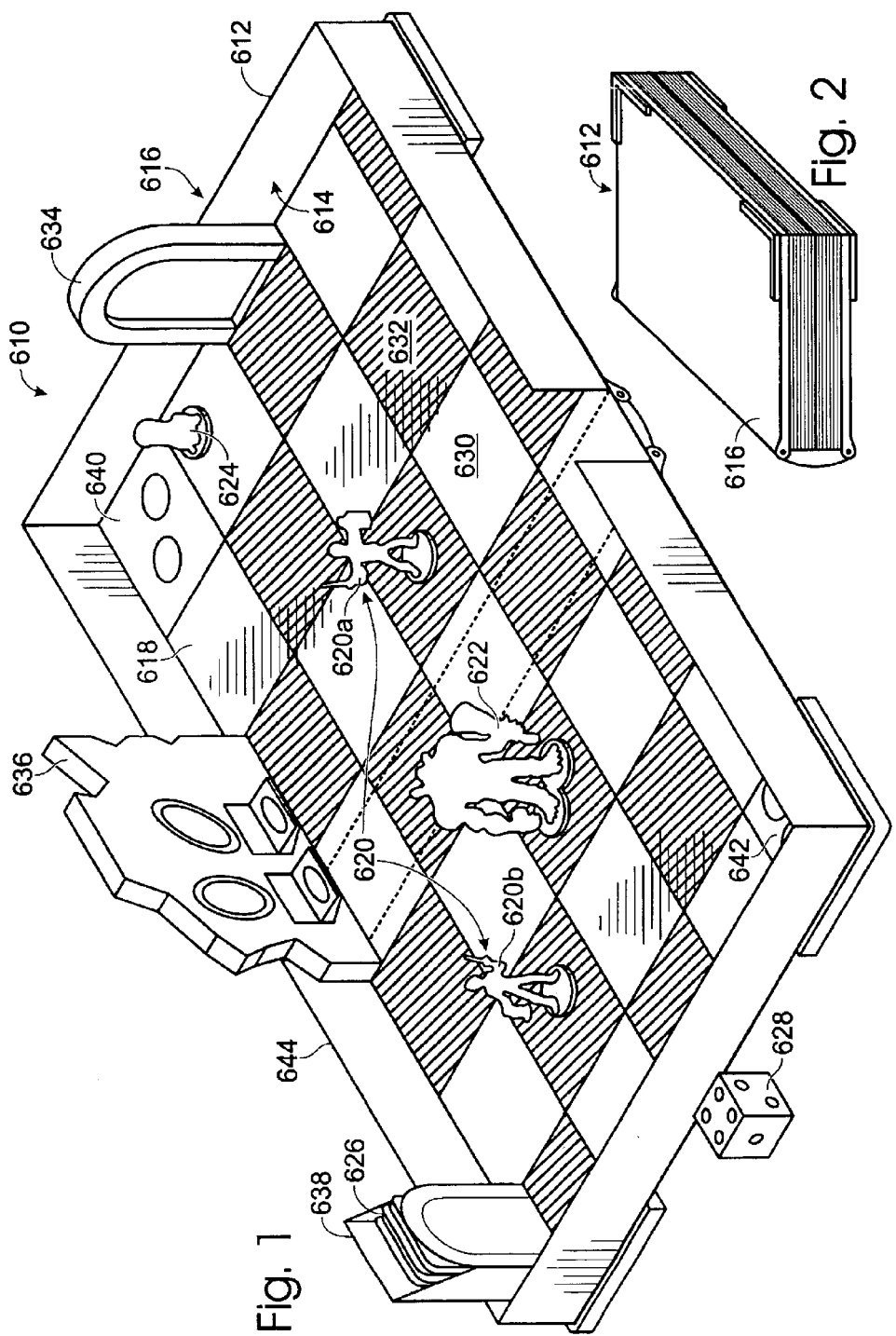

US 6,796,561 B2

GAME WITH COMMONLY MOVED ENEMY

CROSS-REFERENCE TO RELATED APPLICATIONS

This application is based upon and claims priority under 35 U.S.C. §119(e) to the following U.S. provisional patent application, which is incorporated herein by reference in its entirety for all purposes: Ser. No. 60/340,007 entitled "Book Based Games," filed Nov. 1, 2001.

FIELD OF THE INVENTION

The present invention relates generally to board games, and more specifically to board games that resemble a book when closed, and resemble a children's playset when open. The invention also includes various rules and apparatus for playing a board game.

BACKGROUND OF THE INVENTION

Examples of board games that resemble a book are disclosed in U.S. Pat. Nos. 2,221,267, 3,880,429, 4,712,673, 4,781,384, 5,356,155, 5,961,149, and 6,203,017, and examples of board games that include multiple levels or room-like portions are disclosed in U.S. Pat. Nos. 3,767,201, 3,804,416, 4,333,654, 4,534,565, 5,195,750, 5,443,268, 5,678,819 and 6,170,825, the disclosures of all of which are incorporated by reference in their entirety for all purposes.

SUMMARY OF THE INVENTION

The present invention includes portable games carried in a plastic case that resembles a hard-backed book. Opening the book unfolds the game board. Various embodiments may be based on an individual chapter from a published children's book or novel.

Preferably, the housing and game board double as a play set, for use with detailed figures and environments.

The present invention further includes rules and apparatus for playing a board game in which players move their own game pieces and a commonly controlled chaser piece across a game board.

The advantages of the present invention will be understood more readily after a consideration of the drawings and the Detailed Description.

BRIEF DESCRIPTION OF THE DRAWINGS

FIG. 1 depicts one embodiment of the game of the present invention, including a housing, multiple chambered playing surface, and playing pieces.

FIG. 2 depicts the housing of FIG. 1 in a closed position.

DETAILED DESCRIPTION AND BEST MODE OF THE INVENTION

The present invention is a game played by at least two players involving strategy and chance. As will be understood, game 610 may incorporate elements from a particular theme or popular cultural phenomenon, such as a book or movie. In such a case, the elements of game 610 may include depictions, shapes, and colors that reflect or exemplify this theme or phenomenon. In particular, game 610 may be based on a particular portion of popular media, such as a chapter of a book or novel.

An exemplary embodiment of game 610 is shown in FIG. 1. Typically, game 610 includes a housing 612 having an inner surface 614 and an outer surface 616. Game 610 further includes a game board 618, located on inner surface 614, player movers 620, a chaser mover 622, a target 624, a set of cards 626 and a random number generator such as die 628.

Game board 618 generally includes a plurality of spaces 630 on which the player movers, chaser mover and target may be placed. Game board 618 further includes a number of draw card spaces 632, which may be marked by a color, drawings, or other suitable indicia.

The set of cards 626 may include any number of suitable cards including cards that enable or require a player to move the chaser mover, and cards that enable or require a player to move their player mover and attack the chaser mover. The cards may additionally include indicia indicating the number of spaces the movers are to be moved.

As stated above, game 610 may be based on a particular piece of popular media such as a book or more. More particularly, game 610 may be based on a portion of the popular media piece such as a book chapter. In such a case, it may be desirable for game 610 to also be used as a play set. As a play set, game 610 may include play items based on those items and situations described in the book or other form of popular media. Furthermore, game 610 may include additional decorative items that are not used in game play according to the rules of the game. For example, game 610 may include the decorative items 634 and 636, as shown in FIG. 1. In addition, some or all of the items used in game play, such as player movers 620, chaser mover 622, and target 624 may be suitable for use as part of the play set.

As stated above, game 610 may further include a housing 612 having an inner surface 614 and an outer surface 616. Typically, housing 612 is adapted to move from an open position, as shown in FIG. 1 to a closed position, as shown in FIG. 2. Generally, game board 618 is accessible for play when the housing is in the open position. The housing may resemble a book when in the closed position. Furthermore, the housing may be adapted to contain all of the playing components including the playing pieces and any decorative items not used in game play when in the closed position.

In one embodiment, the present invention provides rules for using the above-described apparatus wherein players move their individual player movers and the commonly controlled chaser mover around game board 618. Players may draw cards when they land on a draw card space 632. As stated above, the set of cards 626 may include cards that enable or require a player to move the chaser move (chaser cards), and cards that enable or require a player to move their player move and attack the chaser mover (attack cards). Typically, a player may attack and kill or knock out (i.e. remove from the game) the chaser by obtaining an attack card that enables their player mover to move onto the space occupied by the chaser mover. Once the chaser mover is killed, all of the players race to be the first to each the target piece.

As stated above, the game may be based on a well-known popular culture phenomenon, such as a book or movie. Accordingly, the example below is based on the popular children's book *Harry Potter and the Sorcerer's Stone,* by J. K. Rowlings. Accordingly, an example of a set of rules for a game constructed in accordance with an embodiment of the present invention follows:

EXAMPLE I

Harry Potter and the Sorcerer's Stone™

Halloween

Chapter Game

CONTENTS

| | |
|---|---|
| 1 Mini Game Book (12, 612) | 1 Die (628) |
| 1 Troll Mover (i.e. chaser or enemy mover 622) | 10 Cards (626) |
| 1 Harry Mover (i.e. player mover 620a) | 1 Card Holder (634) |
| 1 Ron Mover (i.e. player mover 620b) | 1 Bathroom Door (634) |
| 1 Hermione Figure (i.e. target 624) | 1 Bathroom Wall (636) |

SET UP

1. Unfold the game board 612.
2. Shuffle the Cards 626 and place them in the Card Holder 638.
3. Place the following 3 game pieces on the edge (or wall 644) of the board 612 as directed:

Bathroom Door 634—At the end of the game board by start space 640. as shown in FIG. 1
Bathroom Wall 636—Middle section of game board 612. (See FIG. 1) Card Holder 638—Anywhere you choose. (See FIG. 1)

4. Place the Ron 620b and Harry 620a Movers on the Harry/Ron Starting Space 640 by the Bathroom Door.
5. Place the Hermione and Troll Movers in the opposite corner on the Hermione/Troll start space 642.

OBJECT

First: One player must knock out the Troll. Then, once the Troll is out of the game, both players race to rescue Hermione. The first player to rescue Hermione is the winner.

LET'S PLAY

1. Roll the die. Player with the highest roll gets to play Harry Potter, and goes first.
2. On your turn, roll the die and move the corresponding number of spaces. You can move in any direction except diagonally.
3. Players are permitted to share a space.
4. If you land on a "Draw a card" or "Picture" space 632 (which may include indicia such as a Broken sink, Broken tile, puddle of water, or Drain to indicate that it is a draw a card space) take a Card 626 and lay it face up in front of you. Follow the instructions on the Card 626 and then place it in the rear of the deck. See below under THE CARDS for more details.
5. Once a player has "knocked out" the troll, that player must roll again and move.
6. The Troll is now permanently out of the game and the race is on to save Hermione. See below under HERMIONE for more details.
7. The first player to land on Hermione by exact count wins the game.

THE CARDS

1. You only draw a Card 626 if you land on a picture space 632.
2. There are 2 types of Cards:
    TROLL CARD (Troll Icon): Player who draws this card must move the Troll the number of spaces as indicated on the card HARRY & RON CARD (Harry & Ron Icon): Player who draws this card must move their mover the number of spaces indicated on the card. This card allows players to attack the Troll. (Players can only attack the Troll when moving their mover the number of spaces indicated on the card)
3. Only draw 1 Card on your turn.
    For example: if you draw a Card, move and then land on another picture space 632, you don't get to take a second Card—that is the end of your turn.
4. Return the Card to the rear of the deck after use.

THE TROLL:

1. If the Troll lands on you by exact count, you get sent back to the Harry/Ron Start Space 640.
2. If you land on the Troll by exact count, you have "knocked out" the Troll. (You can only attack the Troll if you draw a Harry & Ron card). The roll is removed from the game.
3. The player who knocks out the Troll must roll again and move.

HERMIONE

1. Hermione cannot be rescued until the Troll has been knocked out.
2. Hermione never moves.
3. You must rescue Hermione by landing on the square she is on by exact count.
4. The first player to rescue Hermione is the winner.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, and/or properties disclosed herein. Similarly, wherein the claims recite "a" or "a first" element or the equivalent thereof, such claims should be understood to include incorporation of one or more such elements, neither requiring nor excluding two or more such elements.

Inventions embodied in various combinations and subcombinations of features, functions, elements and/or properties may be claimed in this or related application. Such claims, whether they are directed to a different invention or directed to the same invention, whether different, broader, narrower or equal in scope to any original claims, are also regarded as included within the subject matter of the inventions of the present disclosure.

What is claimed is:
1. A game comprising:
    a game board including:
        a planar playing field having a plurality of spaces, wherein a subset of the spaces include indicia indicating draw card spaces;
    a commonly controlled enemy mover;

a plurality of individually controlled player movers;

a common target figure; and a plurality of cards including:

an enemy mover card including indicia requiring to move the enemy mover a predetermined number of spaces; and a player mover card including indicia requiring to move at least one of said player movers a predetermined number of spaces.

2. The game of claim 1 where the game board is a rectangular grid comprised of quadrangular spaces.

3. The game of claim 1 where the gameboard include a first, middle, portion hingedly connected to two outwardly extending portions of equal size.

4. The game of claim 1 where the walls extend from the perimeter of the outwardly extending portions and not from the middle portion.

5. A method of playing a game comprising:

providing a gameboard including a plurality of spaces, where a subset of the spaces are draw card spaces having indicia indicating that a player landing on the draw card space should draw a card;

providing a player mover, a commonly controlled enemy mover and a common target figure;

providing a plurality of cards having movement indicia;

providing a random number generator;

generating a number with the random number generator;

moving the player mover on the game board according to the number;

drawing a card when the player mover lands on a draw card space and requiring to move the enemy mover the number of spaces indicated on the card if the card is an enemy mover card; or requiring to move the player mover the number of spaces indicated on the card if the card is a player mover card;

removing the enemy mover from the game board by:

obtaining an attack card;

moving the player mover the number of spaces indicated by the attack card; and landing with exact count on the space the enemy mover occupies; and moving to be first on a space that is occupied by a target figure.

6. The method of claim 5 where the step of winning the game can only be performed after the enemy mover has been removed from the game board.

7. The method of playing game in claim 5 including the steps of:

providing a player mover start space; and returning the player mover to the player mover start space by:

obtaining a card;

moving the enemy mover the number of spaces indicated by the card; and landing the enemy mover on the space the player mover occupies.

8. The method of playing game in claim 7 where the step of returning the player mover to the player mover start space further comprises landing the enemy mover with an exact count on the space the player mover occupies.

* * * * *